Patented Jan. 29, 1929.

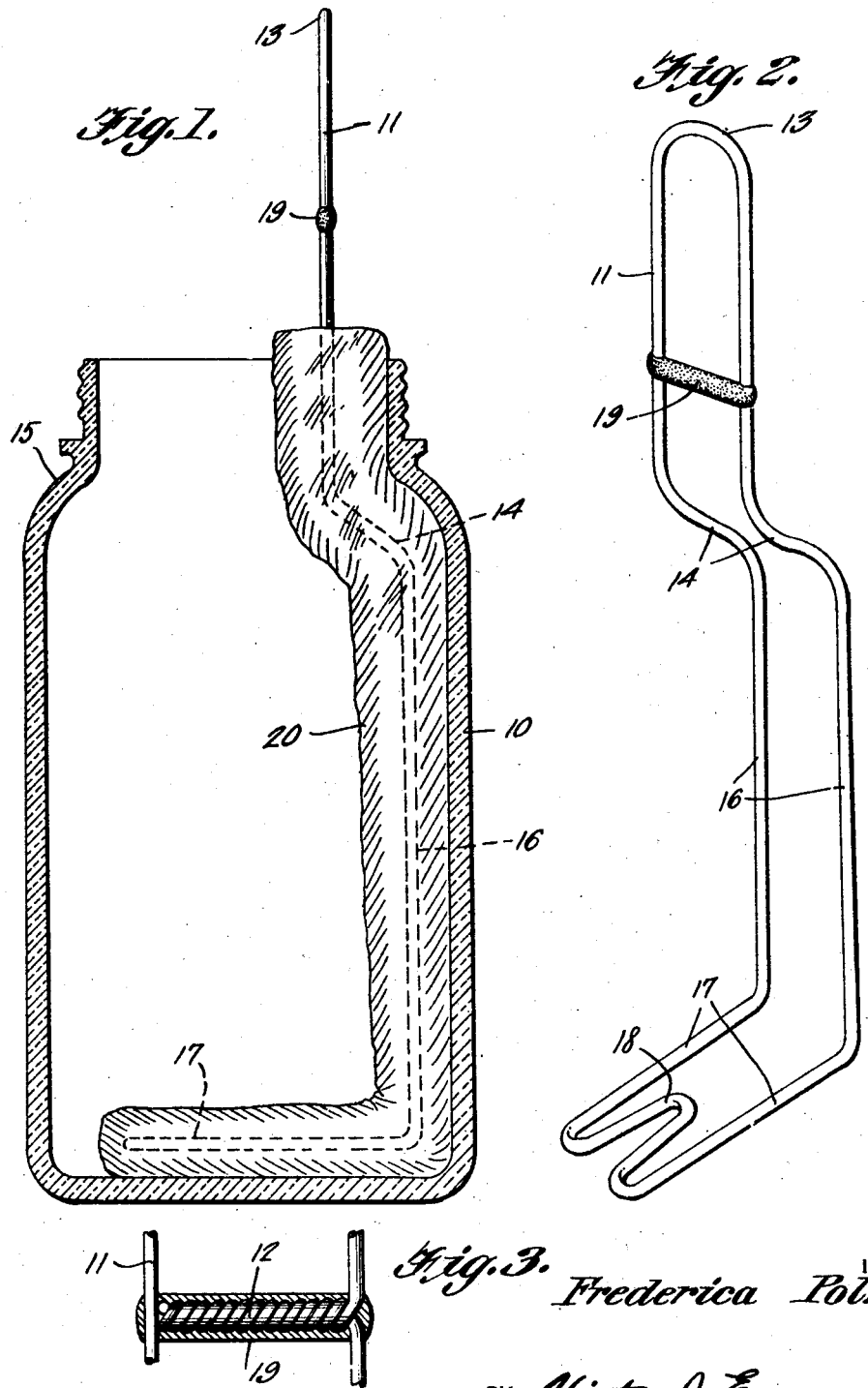

1,700,209

UNITED STATES PATENT OFFICE.

FREDERICA POLZON, OF PRENTICE, WISCONSIN.

JAR-CLEANING TOOL.

Application filed December 23, 1925. Serial No. 77,303.

This invention relates to improvements in cleaning tools, the general object being to cover the tool with a suitable absorbent in order that the tool when inserted and rotated within fruit jars and the like will dry the jars subsequent to washing and scouring in less time than is usually taken when drying such jars with tea towels.

Another object of my invention residing in the specific construction and configuration of my invention contortioned to closely resemble the curvature of the neck, side wall, shoulder and bottom of a jar in order that absorbent material when wrapped upon the tool will evenly engage the side walls, shoulder, neck and bottom of the fruit jar whereby several rotations of the tool will completely dry the inside of the jar.

With the above and other objects in view, the invention further includes the following novel features and details of construction, to be hereinafter more fully described, illustrated in the accompanying drawings and pointed out in the appended claim.

In the drawing:—

Figure 1 is a vertical sectional view taken through a fruit jar and illustrating the manner in which my invention is used in conjunction therewith.

Figure 2 is a perspective of my invention per se.

Figure 3 is a transverse section taken through a portion of my invention and illustrating the manner in which the respective ends thereof are secured.

Referring to the drawing in detail, wherein like characters of reference denote corresponding parts, the reference character 10 indicates a fruit jar of the usual and conventional form and which forms no part of the present application for Letters Patent but which is merely shown for purposes of illustration in bringing forward the novel advantages of the above entitled invention.

The invention resides in the provision of a tool to facilitate the wiping and drying of such jar primarily during the process of canning and which contemplates the provision of a single length of wire 11 having its respective ends wrapped together as indicated at 12, its upper portion forming a yoke 13 or handle engaging portion, its lower portion providing bent portions 14 conforming in configuration to the shoulder 15 of the jar 10 and extending downwardly in spaced parallel arms 16 therefrom, and their lowermost ends terminating in opposite portions 17 providing an inwardly extending looped portion 18 therebetween. The wrapped portions 12 being soldered as indicated at 19 to the opposite sides of the wire in order that the wire will be sustained in spaced parallel relation and held rigidly in such position whereby the latter will not twist or bend during its operation.

The tool as completed being wrapped or covered with a suitable absorbent as indicated at 20 in order that the said tool when inserted into the jar 10 as indicated in Figure 1 of the drawing and given several rotations therein will completely dry the side walls and bottom of the jar whereby hot preserving when poured into such jar will not crack due to moisture contained therein.

The invention is susceptible of various changes in its form, proportions and minor details of construction, and the right is herein reserved to make such changes as properly fall within the scope of the appended claim.

Having thus described the invention, what is claimed is:—

A jar cleaning tool comprising a folded length of wire bent to form a jar bottom engaging portion, a jar side engaging portion, and a handle, the ends of the wire being twisted together, and a cloth covering for the bottom and side engaging portions to contact the sides and the bottom of the jar to clean the same.

In testimony whereof I affix my signature.

FREDERICA POLZON.